United States Patent [19]
Serfass et al.

[11] 3,827,561
[45] Aug. 6, 1974

[54] DEAERATOR FOR DIALYSIS SYSTEM

[75] Inventors: Earl J. Serfass, Largo; Edward R. Lindsay, Jr., Clearwater; Gene Myron Holmes, Seminole; James D. Aid; French Bishop, Jr., both of St. Petersburg, all of Fla.

[73] Assignee: Milton Roy Company, St. Petersburg, Fla.

[22] Filed: Sept. 20, 1972

[21] Appl. No.: 290,638

[52] U.S. Cl.................. 210/180, 210/321, 210/436
[51] Int. Cl............................................ B01d 31/00
[58] Field of Search .................. 55/16, 55, 97, 158; 210/436, 22, 188, 180, 321, 472

[56] References Cited
UNITED STATES PATENTS

| | | | |
|---|---|---|---|
| 3,273,313 | 9/1966 | Livesey et al........................ | 55/55 X |
| 3,515,275 | 6/1970 | Bowman............................... | 210/22 |
| 3,528,550 | 9/1970 | Cappelen, Jr........................ | 210/180 |
| 3,598,727 | 8/1971 | Willuck................................ | 210/188 X |
| 3,626,670 | 12/1971 | Pecker................................. | 210/321 X |
| 3,631,654 | 1/1972 | Riely et al........................... | 210/500 X |
| 3,651,616 | 3/1972 | Blanchard et al.................... | 55/16 |
| 3,701,433 | 10/1972 | Krakauer et al..................... | 210/436 |

*Primary Examiner*—Frank A. Spear, Jr.
*Attorney, Agent, or Firm*—Woodcock, Washburn, Kurtz & Mackiewicz

[57] ABSTRACT

A blood dialysis system has a deaeration chamber with a cylindrical filter. Dialysis fluid passes from the outer surface to the inner bore of a cylindrical depth type filter thereby trapping air bubbles on the outer surface to deaerate the fluid. The inner bore of the cylindrical filter is connected to the outlet port of the chamber. A small diameter bleed hole between the outlet port and the outer section of the chamber prevents excess air from building up around the outside of the filter. The outlet from the deaeration chamber is connected to the inlet of a constant head vessel. The inlet of the constant head vessel is connected to a vertical riser having an opening below the liquid level in the head vessel so that the fluid is discharged into the head vessel without unnecessary turbulence. The turbulence of the discharge of the water otherwise induces the entrainment of air in the solution rather than allowing it to liberate. In another embodiment the water is heated before being supplied to the inner bore of the cylindrical filter. In another embodiment an air permeable membrane is positioned across the top of the head vessel. In another embodiment a nozzle is included in the inlet to the deaeration chamber to subject the incoming fluid to subatmospheric pressure thereby increasing the size of the air bubbles making them easier to filter out of the fluid stream.

10 Claims, 6 Drawing Figures

PATENTED AUG 6 1974 3,827,561
SHEET 1 OF 4
Fig. 1
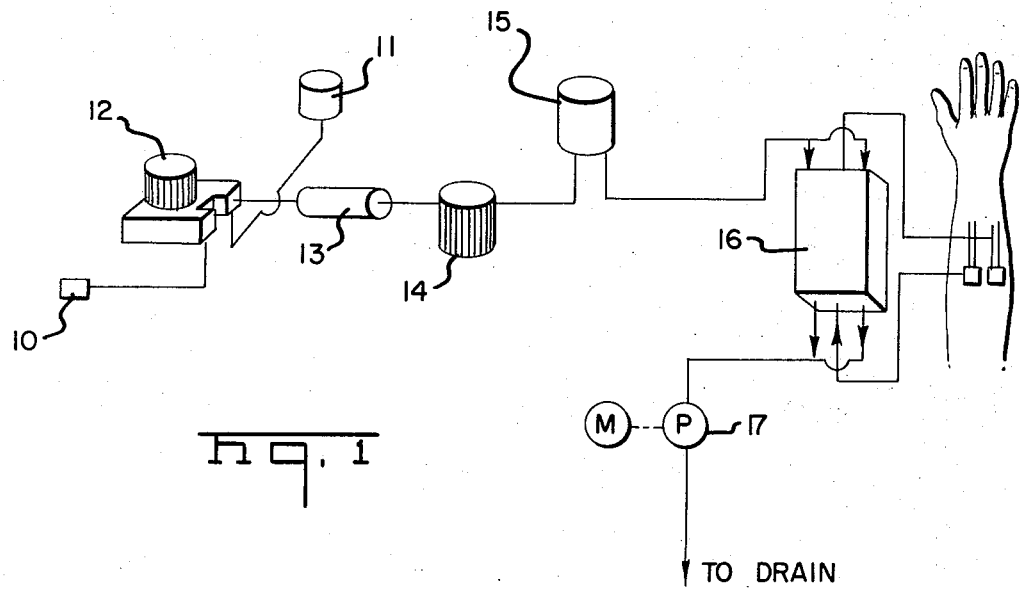
Fig. 2
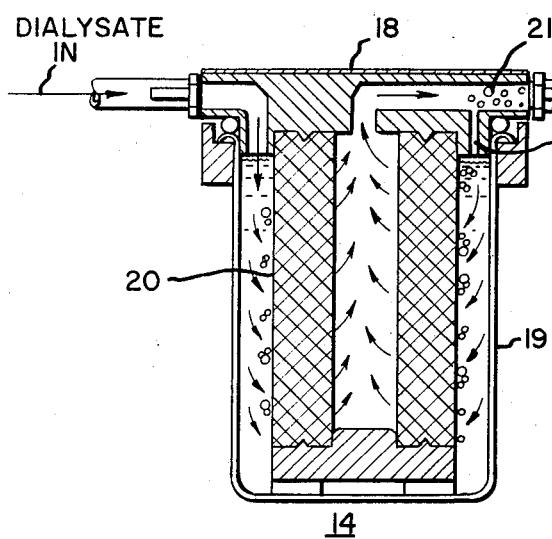
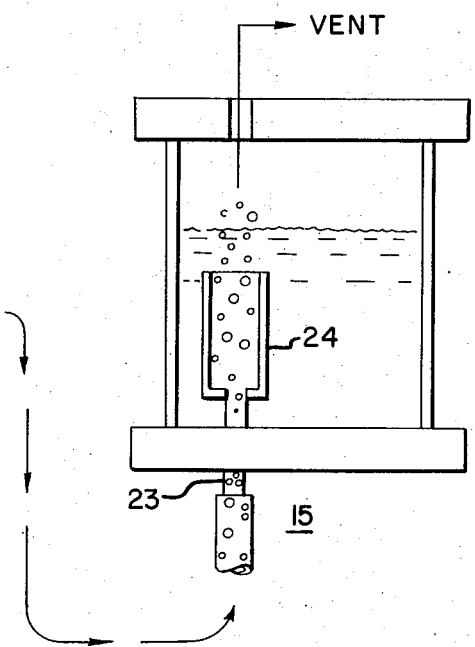

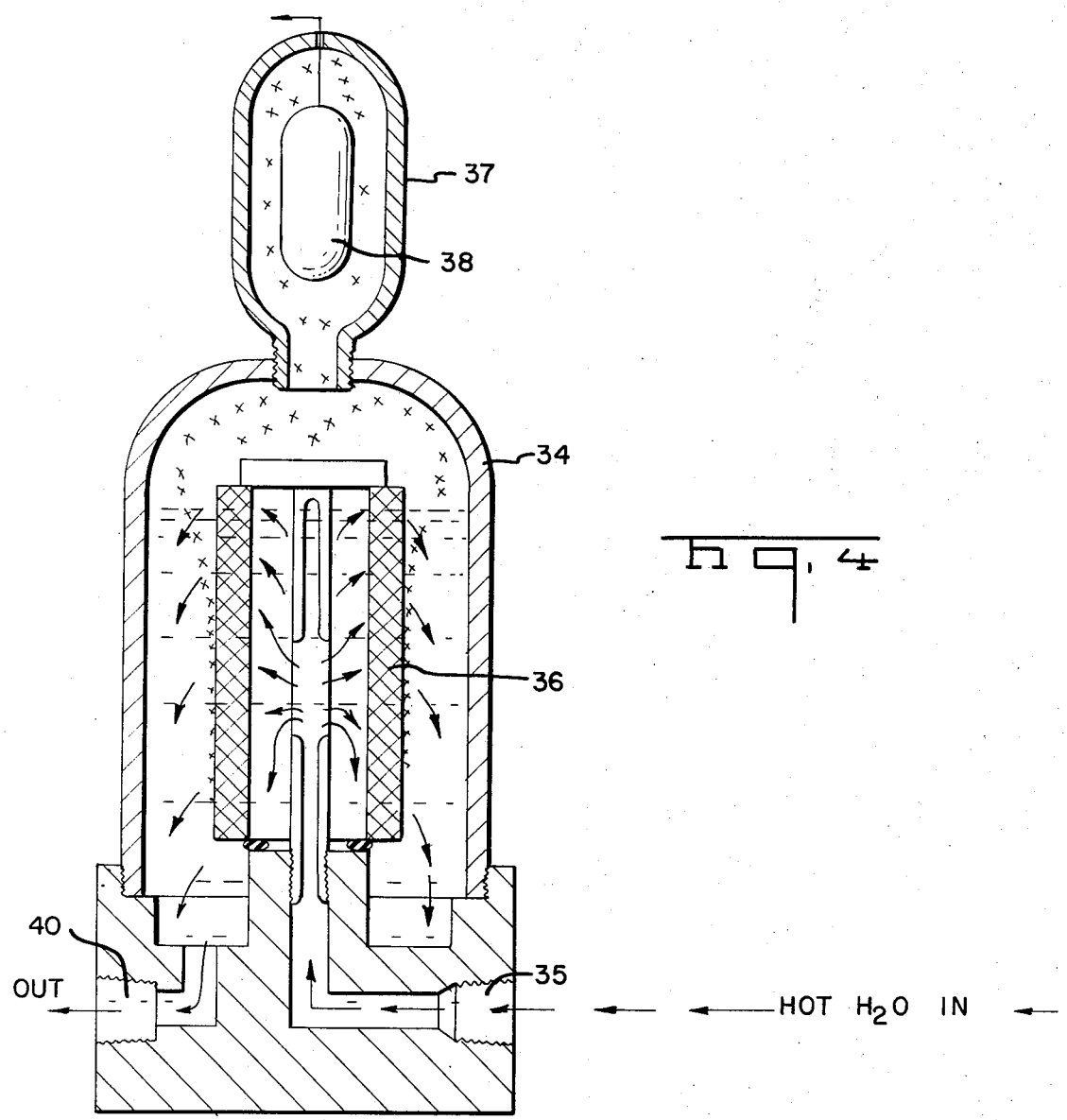

TO SUCTION OF EFFLUENT PUMP

DIALYSATE IN

DEAERATOR FOR DIALYSIS SYSTEM

BACKGROUND OF THE INVENTION

This invention relates to the deaeration of dialysis fluid in a blood dialysis system.

Hemodialysis systems have been successfully employed as a therapeutic measure for kidney failure. In this treatment dialysis fluid is circulated through a dialyzer. Systems for the preparation and distribution of dialysis fluids are described in an article by Grinsrud, Cole, Lehman, Babb and Scribner in *Transactions of the American Society of Artificial Internal Organs*, Vol. X, 1964, and in U.S. Pat. No. 3,441,136 - Serfass et al. U.S. Pat. No. 3,506,126 - Serfass et al describes a closed loop recirculating hemodialysis system.

In such systems the formation of air bubbles is a problem. Cold tap water is heated. The dialysate concentrate is mixed with the heated water to form the dialysis fluid. The combination of heating, reduced pressure and residence time in the system causes air bubbles. These air bubbles accumulate on the dialysis membrane to impede the dialysis transfer through the membrane and otherwise interfere with proper operation of the system. The air bubble problem is particularly acute in colder climates in which the cold tap water has a large amount of dissolved air. Sometimes the air accumulation is so great on the dialysis membrane that it is transferred through the membrane into the blood. Most systems have a venous drip chamber for deaerating the blood. When air is transferred through the membrane, frothing of the blood in the drip chamber may occur. This makes it necessary to evacuate the venous drip chamber at frequent intervals. Or, if the drip chamber is not evacuated, and air is allowed to escape from the drip chamber, the possibility of an air embolism in the patient exists.

The problem of air bubbles in the dialysis fluid is becoming an ever more troublesome problem because new dialyzers are operated at greater negative pressures. Specifically the capillary kidney dialyzer requires negative pressure of −400, −450 mm. of mercury. Because of the physical characteristics of the capillary tube it does not ultra filtrate with pressure differential of nominal levels. New disposable type dialyzers becoming available also are operated at very high negative pressures. The higher negative pressures increase the problem of air bubble formation.

Attempts to cope with this problem in existing dialysis systems have included the use of beryl saddles in the head vessel. The air bubbles tend to coalesce on these saddles thereby preventing them from getting into the stream supplied to the dialyzer. However, this has not been effective in all instances.

Another approach has been taken in the dialysis system described in U.S. Pat. No. 3,406,826 Willock. In this system the water is heated in a heat exchanger before mixing with concentrate. The air forms large bubbles in the dialysis fluid. Then the fluid is supplied to a chamber in which the air bubbles rise to the top while fluid is withdrawn from the bottom.

In a similar system shown in U.S. Pat. No. 3,598,727 Willock, a pressure drop is used to form the large bubbles. Again, the fluid is supplied to a chamber wherein the bubbles rise to the top while the fluid is withdrawn from the bottom.

The relationships between pressure, temperature and the solubility of gas in a fluid are well known. *Chemical Engineers Handbook*, Perry, 4th Edition, 1963, McGraw-Hill Book Co., pages 14-2, 14-3 contains a discussion of Henry's Law and the relationships between gas solubility and the temperature and pressure of the fluid.

Filters have previously been used to separate gases from liquids. For example, U.S. Pat. No. 3,273,313 describes the use of a vacuum chamber with a filter for removing air from oil in a hydraulic servosystem, or deaerating boiler feed water.

SUMMARY OF THE INVENTION

In accordance with this invention a cylindrical filter having an inner and an outer surface is included in a deaeration chamber for a hemodialysis system. The dialysis fluid is supplied to one surface of the filter. Fluid is forced through the filter to the outlet of the deaeration chamber. The air nucleates on the outside of the filter as the dialysate passes through the filter. A small bleed hole prevents the accumulation of air. Without the important feature of the invention, the accumulation of air drops the fluid level on the inlet side of the filter and thereby reduces the effective area for transfer of fluid through the filter. As this effective area is reduced, the pressure drop across the filter increases until the air being captured above the water suddenly breaks through the filter resulting in the water level rising. This causes an erratic pressure variation.

In accordance with another important aspect of this invention, the filter is a depth type filter, i.e. one in which the particle retention level increases toward the inner diameter of the filter.

In accordance with another aspect of the invention the constant head vessel to which the aeration chamber is connected has a vertical riser with an opening which is below the liquid level in the head vessel so that fluid is discharged into the head vessel without unnecessary turbulence. The turbulence of the discharge of the water otherwise induces the entrainment of air in the solution rather than allowing it to liberate.

In accordance with another aspect of the invention an air permeable membrane may be provided across the top of the head vessel so that air can be drawn off through this membrane from the top of the vessel.

In accordance with another aspect of the invention a nozzle may be included on the inlet of the aerating chamber to subject the incoming fluid to a pressure drop which increases the size of the air bubbles in the incoming fluid.

The use of deaeration filters in accordance with this invention has important advantages and benefits. The efficiency of the dialysis is increased because air bubbles do not significantly accumulate on the dialysis membrane to reduce the dialysis efficiency of that membrane. Frequent evacuation of the venous drip chamber because of air bubble frothing is avoided. A reduced fluid level in the drip chamber has an attendant risk of venous emboli which is avoided by this invention. Also, most dialysis systems have a colorimetric detector for sensing the presence of blood in the dialysis fluid in order to signal an alarm of a blood leak. The optics of these colorimetric detectors often become obscured by air bubbles thereby signalling a false alarm of a blood leak. Similarly, spurious conductivity alarms may be caused as bubbles pass through the conductivity cell. These problems are significantly reduced by us of the present invention.

The foregoing and other objects, features and advantages of the invention will be better understood from the following more detailed description and appended claims.

DESCRIPTION OF THE DRAWINGS

FIG. 1 shows a dialysis system;
FIG. 2 shows the aeration chamber and head vessel;

FIG. 3 shows an embodiment in which the dialysis fluid is heated before it is filtered;

FIG. 4 shows the deaeration chamber of the embodiment of FIG. 3;

DESCRIPTION OF THE PREFERRED EMBODIMENT

Figure 7:
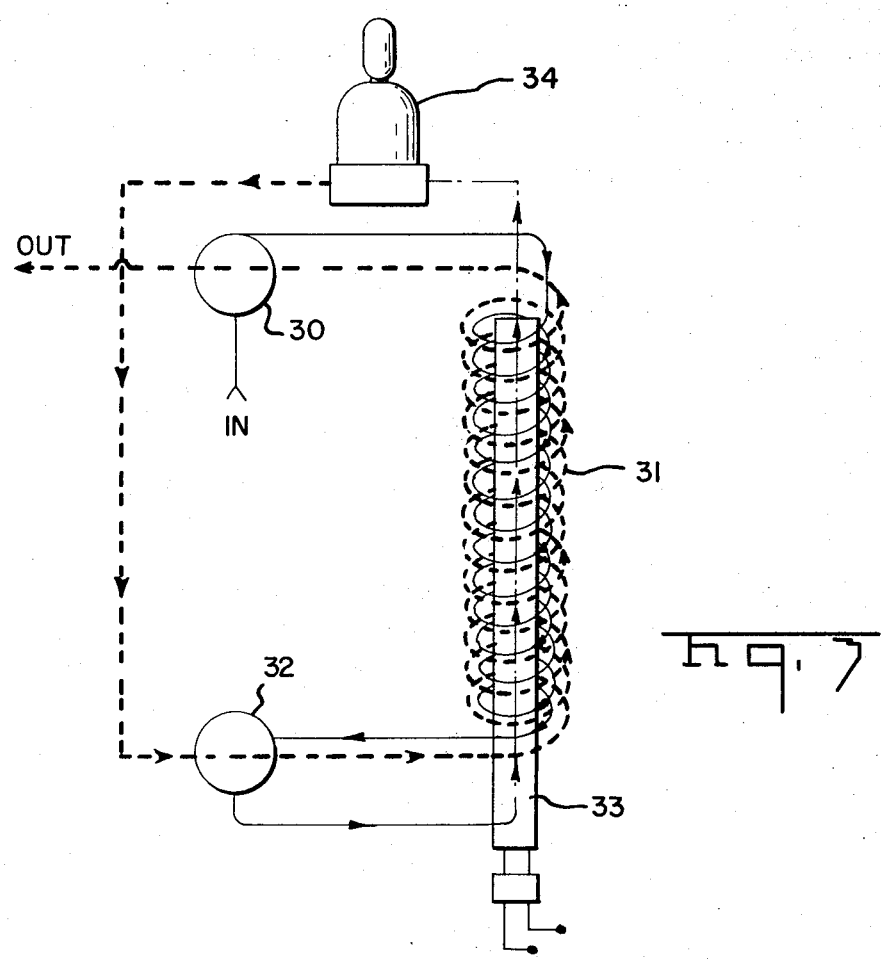

FIG. 1 depicts a typical hemodialysis system. The dialysis fluid is a mixture of tap water from the source 10 and concentrate from the tank 11. The concentrate and tap water are mixed in precise proportions by a duplex pump 12. Dialysis fluid is heated in heater 13 and the fluid at the proper temperature is supplied to the deaeration chamber 14, which will be subsequently described in more detail. (In actual practice, the tap water is heated prior to mixing with the concentrate.) The fluid from the outlet of the deaeration chamber is supplied to a head vessel 15. A sufficient quantity of dialysis fluid is maintained in the head vessel to provide a continuous supply of fluid to the dialyzer 16. Many suitable dialyzers are known. They include inlet and outlet ports for passage of the dialysis fluid on one side of a membrane and inlet and outlet ports for passage of the patient's blood on the other side of the membrane. (As used here, "membrane" includes the dialyzers in which a large number of small capillary tubes transport the blood through the surrounding bath of dialysis fluid so that dialysis transfer takes place through the walls of the capillary tubes which may be thought as the membrane.) An effluent pump 17 pulls dialysis fluid from the outlet ports of the dialyzer. More details of a dialysis fluid supply system are given in the aforementioned Serfass et al. U.S. Pat. No. 3,441,136.

FIG. 2 shows the aeration chamber 14 and the head vessel 15 in more detail. A stainless steel support plate 18 is sealed to the main portion 19 of the chamber. A 316 stainless steel standard commercially drawn can provides a totally inert enclosure suitable for use in a dialysis system. Other parts of the assembly are machined from inert polypropylene. The incoming stream of dialysis fluid is discharged into the chamber around the cylindrical particle filter 20. In one satisfactory embodiment of the invention the filter element has an inside diameter of 1 inch and an outside diameter of 2 ½ inches and the cylinder is 4 7/8 inches long. The filter is made of cellulose fibers bonded with a phenolic resin and having a particle retention level of 50 microns. (Particle retention level is a known designation for filters. Such a filter will block 90 percent of particles having a size of 50 microns or larger.)

The filter is a depth type of filter. That is, it has a decreasing porosity with depth. At the outside surface of the filter the fibers are relatively porous but the porosity decreases so that only at the inside surface is the 50 micron particle retention level attained. One common technique for fabricating filters of this type is to suck cellulose particles against a spinning mandrel. One suitable type of depth filter is commercially available from the AMF Cuno Division, American Machine and Foundry Co., Meriden, Connecticut. This type of filter may be contrasted with the more normal surface type filter in which all of the filtering action takes place on the surface. Surface type filters are susceptible to occlusion by particulate matter.

The dialysis fluid passes through the filter into the inner bore of the filter. This is connected to the outlet 21 of the aeration chamber.

The air is coalesced on and within the outer layer of filter fibers. The coalesced air grows into macro bubbles which periodically break loose and rise to the top of the inlet cavity. A small diameter bleed hole 22 (1/16th inch diameter) is provided at the top of the chamber. This small bleed hole connects the outlet port of the chamber with the section of the chamber containing unfiltered, air-containing, fluid. This small bleed hole 22 allows the collected air to escape as large bubbles into the outlet dialysis stream of the filter. Without this bleed hole, the air accumulates on the inlet side of the filter. This lowers the fluid level and reduces the effective functional area of the filter. As the fluid level drops, the pressure drop across the filter element increases until the pressure is sufficient to cause the accumulated air to leak through the filter element. On occasion, large quantities of air have been observed passing into the head vessel causing the fluid level in the head vessel to momentarily drop.

The volume of dialysate which bypasses the filter element through the 1/16th inch bleed hole 22 has been found to be negligible. Also, this bleed hole serves as a relief passage preventing over pressuring of the deaeration chamber.

The outlet 21 of the deaeration chamber is connected to the inlet 23 of the constant head vessel 15. A vertical riser 24 is connected to the inlet of the constant head vessel. This vertical riser has an opening below the liquid level in the constant head vessel. In one embodiment of the invention the inlet 23 is a 1/4 inch outside diameter tube and it is connected to the vertical riser 24 having a ½ inch inside diameter approximately 2 inches long. The inside diameter of this tube is optimized to insure that the bubbles reach the surface of the head vessel with sufficient velocity to be released. If the bubbles are propelled at a higher velocity they tend to break up and go back into solution.

The provision of this vertical riser 24 is an improvement over prior head vessels insofar as deaeration is concerned. For example, some prior systems have used a spray bar in the head vessel. This discharges the fluid into the vessel in a manner which gives some mixing. However, it has been found that this type of head vessel introduces air bubbles which are not introduced by the arrangement shown in FIG. 2.

FIG. 3 shows an embodiment in which water, used in the preparation of dialysis fluid is degassed. The water enters the heat exchanger through the fitting 30. The heat exchanger 31 is of the type which has two concentric passages. Fluid is transferred from the fitting 30 to the fitting 32 through one of these passages. Then, it is connected to the inlet of the heater 33. The outlet of the heater is connected to the deaeration chamber 34 which includes a filter. The dialysis fluid is filtered at its highest temperature. In this way, the maximum deaeration effect is achieved. The outlet from the deaeration chamber is connected back to the fitting 32 of the heat exchanger. Fluid is transferrd through the other passage in the heat exchanger thereby effecting a heat exchange. Water exits from fitting 30 of the heat exchanger from which it is normally supplied to the head vessel.

The heat exchanger-heater-filter combination of FIG. 3 has significant advantages. Fluid enters the heat exchanger at the fitting 30 at ambient temperature, approximately 70°F. as an example. Heat exchange with fluid in the other passage heats the incoming fluid to a temperature of approximately 200°F as the fluid passes out of the heat exchanger at the fitting 32. As the fluid passes through the heater 33 the temperature rises another incremental amount, for example to about 205° F. At this elevated temperature, the fluid passes through the deaeration chamber 34 including the filter. Deaeration at this elevated temperature is quite effective because the air is in large bubbles due to the reduced solubility of the air in the heated fluid and because the pressure applied to the fluid is progressively reduced from the line pressure. As the fluid again passes through the heat exchanger, it gives up heat so that the temperature as it exits from the fitting 30 is a few degrees above ambient, approximately 72°F in the example under consideration.

This arrangement has significant advantages. The heater is only required to supply a small amount of heat. This is the amount to replace heat losses plus the amount necessary to elevate the temperature between the inlet and the outlet. (In the example, the fluid was heated from 70°F. to 72°F. between the inlet and the outlet but of course the system could be arranged so that the temperature is the same at the inlet as at the outlet.) Even though the heater supplies only a small amount of heat, the deaeration take place at a very high temperature. This is made possible by the heat exchanger.

FIG. 4 shows the details of the deaeration chamber 34. Hot water enters through the fitting 35 and is supplied to the inner bore of a cylindrical filter 36. In this embodiment a sintered metal filter has been found to be suitable for use. It has an inner surface and an outer surface. Fluid passes from the inner surface to the outer surface. A significant release of air occurs as the fluid passes through the filter. This air accumulates in the top of the deaeration chamber 34. It is released from a hole in the top of the float chamber 37. As the air accumulates in the top of chamber 37, the float 38 is forced downwardly thereby opening the vent in the top of the chamber. The deaerated fluid exits from the exit port 40. Alternatively, the opening may be connected through small bore tubing to a source of vacuum such as the effluent pump.

A small bleed hole may be provided in the top of the filter 36 to prevent the accumulation of air inside of the filter.

Figure 5:
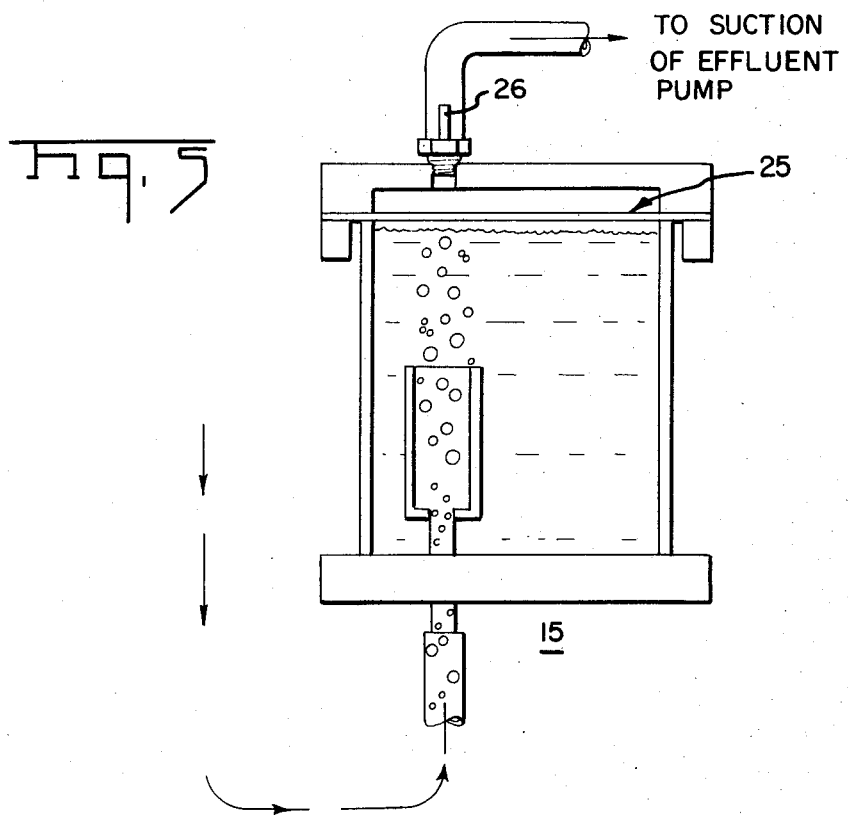
FIG. 5 shows another embodiment of the head vessel.

FIG. 5 shows an alternative embodiment in which an air permeable membrane 25 is positioned at the top of the head vessel. The negative suction of an effluent pump is applied to the port 26 to provide the necessary pressure differential to move the liberated air through the membrane. While the gas permeable membrane has been shown in the head vessel, it may also advantageously be employed in the deaeration chamber or in another vessel.

Considerable attention is being given to the development of closed loop dialysis systems such as the system in the aforementioned U.S. Pat. No. 3,441,136. In this type of system a significant improvement in deaeration can be obtained by locating the deaerator just ahead of the dialyzer. Removal of air is enhanced when done at the highest temperature and the lowest pressure to which the fluid is subjected. By minimizing the transit time between the deaerator and the dialyzer the amount of air coming out of solution can be kept very small. This in turn keeps the transfer of air across the dialyzer membrane to a minimum.

Figure 6:
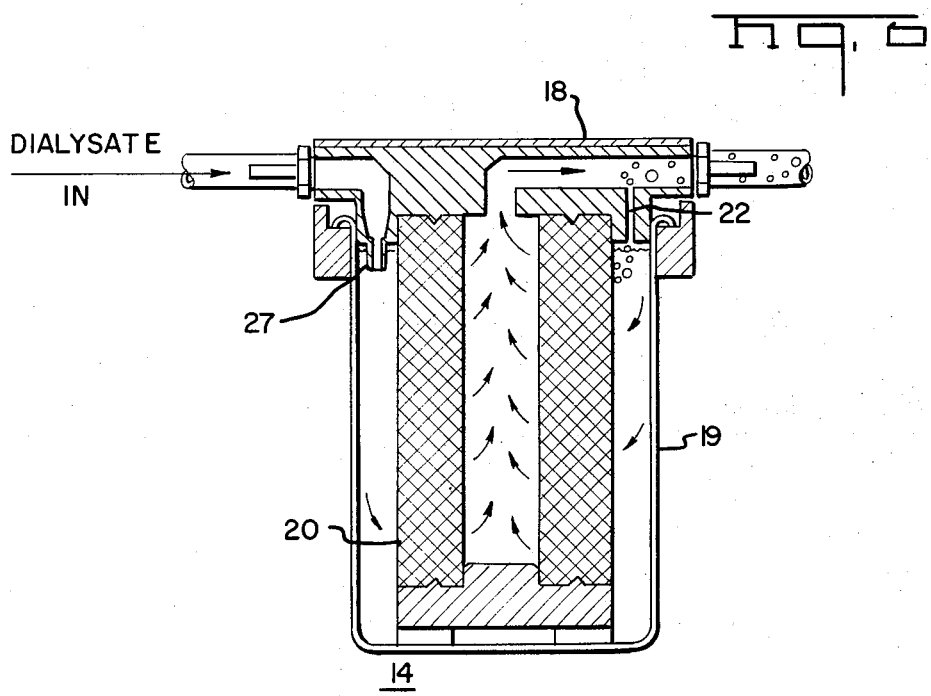
FIG. 6 shows another embodiment of the deaeration chamber.

Another embodiment of the deaeration chamber is shown in FIG. 6. In this embodiment a nozzle or venturi 27 is connected in the fluid inlet to the deaerator. This enchances the liberation of air. The liberated bubbles of air form as macro bubbles on the fibers of the filter. The significant pressure drop of approximately 10 to 40 psi associated with the passage of the fluid through the nozzle can be tolerated if a proportioning pump such as the commercially available Milton Roy mRoy™-pump is utilized. This pump is more than adequate to meet this pressure requirement.

There are other known techniques for decreasing the pressure on the fluid. For example, a pump may be used to obtain a high pressure on the dialysis fluid. Then, the fluid passes through a valve to a reduced pressure. At this reduced pressure the bubbles form. Filtering at this point is quite effective to remove air.

As an alternative to providing a separate deaeration chamber 14 and head vessel 15, the functions of these elements can be performed by a single vessel. In such a vessel, the drifts in conductivity, temperature and preparation are integrated out. The vessel can be closed and a membrane can be placed across it so that any air accumulated outside the filter will rise to the top of the vessel and go through the membrane.

While particular embodiments of the invention have been shown and described, it will be understood that various other modifications may be made without departing from the true spirit and scope of the invention. The appended claims are, therefore, intended to cover any such modification.

What is claimed is:
What is claim is:
1. A dialysate preparation apparatus for a blood dialysis system of the type including:
  a dialyzer having a membrane,
  blood ports for passage of blood through said dialyzer on one side of said membrane,
  an inlet dialysate port and an outlet dialysate port for passage of fluid through said dialyzer on the other side of said membrane, and
  a source of fluid, said apparatus comprising:
    a deaeration chamber having an inlet port and an outlet port connected between said source and said dialyzer,
    a depth type cylindrical filter having an inner surface and an outer surface disposed in said chamber, said depth type filter having a particle retention level which increases with the distance between the outside diameter and the inside diameter of said filter, said inlet port of said chamber supplying fluid to the outer surface of said cylin- der, the inner surface of said cylinder being in communication with said outlet port so that fluid passes through the filter to remove air from said fluid, and a small bleed hole between the outer surface of said filter and said outlet port to release accumulated air which would otherwise cause erratic fluid transfer.

2. The system recited in claim 1 further comprising:

a heat exchanger connected between said source of fluid and said deaeration chamber, said heat exchanger having two passages for transfer of fluid in heat exchange relationship between the two passages, a heater connected to the outlet of one of said passages, said deaeration chamber being connected between the outlet of said heater and the inlet of the other passage so that deaeration takes place at the highest temperature in said system.

3. The system recited in claim 1 wherein dialysis fluid is supplied to the outer surface of said cylindrical filter, wherein the inner bore of said cylinder is in communication with the outlet port of said deaeration chamber so that dialysis fluid passes from the outer surface of said filter to the inner surface of said filter and wherein said bleed hole is between the outlet port of said chamber and the section of the chamber communicating with the outer surface of said cylindrical filter to release air which accumulates on the outer surface of said filter.

4. The system recited in claim 1 further comprising a constant head vessel connected between the outlet port of said chamber and the inlet port of said dialyzer, the inlet to said head vessel being connected to a vertical riser having an opening below the liquid level in said head vessel so that fluid is discharged into said head vessel without unnecessary agitation which causes air bubbles.

5. The system recited in claim 4 further comprising an air permeable membrane across the top of said head vessel, and a source of vacuum connected to an opening at the top of said vessel for drawing off air through said air permeable membrane.

6. The system recited in claim 1 further comprising:

pressure reducing means connected between said source of dialysis fluid and said deaeration chamber for subjecting the incoming fluid to a reduced pressure which increases the size of the air bubbles in the incoming fluid thereby increasing the coalescence of air bubbles in said filter.

7. The system recited in claim 6 wherein said pressure reducing means comprises a nozzle on the inlet of said deaeration chamber subjecting the incoming fluid to a reduced pressure which increases the size of the air bubbles in the incoming fluid.

8. A dialysate preparation apparatus for a blood dialysis system of the type including:
a dialyzer having a membrane,
blood ports for passage of blood through said dialyzer on one side of said membrane,
an inlet dialysate port and an outlet dialysate port for passage of fluid through said dialyzer on the other side of said membrane, and
a source of fluid, said apparatus comprising:
a deaeration chamber having an inlet port and an outlet port connected between said source and said dialyzer,
a filter having a first surface and a second surface disposed in said chamber, said inlet port of said chamber supplying fluid to one surface of said cylinder, the other surface of said cylinder being in communication with said outlet port so that fluid passes through the filter to remove air from said fluid, and
a heat exchanger having two passages for transfer of fluid in heat exchange relationship between the two passages, said two passages each having an inlet and an outlet, fluid from said source being supplied to an inlet of one passage, and
a heater connected to the outlet of said one of said passages, said deaeration chamber being connected between the outlet of said heater and the inlet of the other passage, the outlet of said other passage supplying fluid to said dialyzer so that deaeration takes place at the highest temperature in said system.

9. The apparatus recited in claim 8 wherein said filter is a cylindrical filter having an inner surface and an outer surface.

10. The apparatus recited in claim 9 wherein the inlet port of said chamber is connected to the inner surface of said filter, the outlet of said chamber being in the bottom thereof so that deaerated water passes from said outlet after passing through said filter, said air accumulating in the top of said deaeration chamber, and an air release in the top of said deaeration chamber.

* * * * *